Jan. 25, 1966   B. WEBSTER   3,231,134
SPRAYING LIQUIDS
Filed Aug. 13, 1962   8 Sheets-Sheet 1

Inventor
BERNARD WEBSTER
By Mirie & Smiley
Attorneys

Inventor
BERNARD WEBSTER

Attorneys

Inventor
BERNARD WEBSTER

By
Attorneys 3,231,134
SPRAYING LIQUIDS
Bernard Webster, Walton-on-Thames, England, assignor to Joseph John Lorant, East Molesey, Surrey, England
Filed Aug. 13, 1962, Ser. No. 218,478
Claims priority, application Great Britain, Sept. 1, 1961, 31,575/61
12 Claims. (Cl. 222—1)

This invention relates to improvements in the production of foam and applying foam to surfaces, and particularly to an improved method and apparatus for producing foam and applying it to surfaces, such as the exteriors or interiors or aircraft, public service or other vehicles, or standing installations such as tanks or buildings, to clean them for example. Hitherto, chemical cleaning fluids have been applied to the surfaces by sponging or spraying for example and after the chemical substance has performed its function it is washed, wiped, or sprayed off. This method is wasteful of liquid as much of the applied chemical solution runs off the surface and is to lost. In hot climates the solution may evaporate quickly, making the desired operation more difficult.

Many methods have hitherto been used to produce foam for such purposes as fire-fighting for example, but such methods do not produce the persistent foam required for cleaning surfaces, which foam must be sufficiently long lasting to remain on a surface onto which it is sprayed long enough for cleaning constituents contained therein to be fully effective.

The main object of the present invention is to provide, by means of simple, light-weight, inexpensive equipment and in a rapid and economical manner, a foam material which will be persistent enough in all ambient atmosphere conditions to clean thoroughly a surface engrained with stubborn deposits and in a rapid and economical manner.

A further object of the invention is to provide a method of applying a foamed material to a surface, said method comprising feeding a foamable liquid and at least one other liquid under pressure to an elongated foaming chamber containing over a major portion of its length a foam inducing material having a multiplicity of tortuous fine passages therethrough, separately feeding a gas to the chamber, the rate of flow and pressure of the liquids and gas in the chamber being such as to force the foamable liquid through said passages continuously to effect momentum changes and to cause foaming of the foamable liquid by dispersal of the gas as a plurality of bubbles therein, and discharging the foamed liquid on to a surface directly from the chamber without the addition of further materials through a closely associated spraying device in direct communication with the foaming chamber.

Another object is to provide a method in which the foamable liquid and a predetermined amount of one of said other liquids, which may be a diluent for the foamable material, are first fed to a metering chamber, said one of said other liquids having been caused to impart its pressure to each said liquid so that the liquids are fed to the metering chamber at the same pressure, mixing the liquids in the metering chamber in predetermined proportions, and feeding the metered and mixed liquids under pressure to the said foaming chamber.

A still further object of the invention is to provide an appparatus for applying a foamed material to a surface comprising an elongated foaming chamber having means for introducing thereinto under pressure a gas and at least two liquids, one of which is a foamable liquid, a foam inducing material disposed in said chamber and extending over a major portion of the length of said chamber, said material having a multiplicity of tortuous fine passages therethrough, through which the gas and the liquids are passed continuously to effect momentum changes therein to cause foaming of the foamable liquid by dispersal of the gas as a plurality of bubbles therein, and a spraying device closely associated with the chamber and in communication with the interior thereof for spraying the foamed liquid direct from said chamber without the addition of further materials onto a surface.

The gas, such as compressed air e.g. at 30 pounds per square inch pressure, is supplied to the chamber to cooperate with the foam inducing material to form a foam for spraying. The gas may be introduced into the chamber by any suitable means such as under pressure from a pump or induced by venturi action.

The sprayed foam will adhere to the surface due to the bubbles therein which reduce the effect of area/weight ratio on the foamed material and so reduce the specific gravity of the material and increase the air friction effect.

The foamable liquid may consist of a detergent, a wetting agent for the detergent and a foaming agent. The foamable liquid and a diluent therefore may be separately supplied to a mixing chamber which may be under reduced pressure and the mixture of foamable liquid and diluent, or the foamable liquid alone if a diluent is not used, are forced under pressure to a foaming chamber containing the foam inducing material.

The foam inducing material is preferably a spiral or number of spirals, e.g. wire, a network, a lattice, a mass of open fibres, gauze or cellular material with fine passages extending therethrough.

Examples of foamable liquids for use in cleaning painted surfaces, removal of existing paint coatings or brightening metal surfaces are respectively:

(1) Solutions of alkaline detergent such as alkali metal silicate and phosphates with added wetting agent such as long chain alkyl sulphonates or quaternary substituted amines with or without added foaming agent.

(2) Solution of phosphoric acid, non ionic wetting agents, thickening agents such as cellulose ethers and with or without added foaming agents.

(3) Chlorinated hydrocarbons, thickeners such as methyl cellulose non ionic surfactants with or without the addition of foaming agents.

The spraying device may be supplied with foamed liquid through a pipe connected to a multiple valve or a group of valves in turn connected to the foamable liquid supply, a water supply and a compressed air supply, the valve or valves being operable to enable foamed liquid, aerated rinsing water, rinsing water or air to be supplied at will to the spraying device.

The foaming chamber and the spraying device are constructed as a unit or serially disposed remote foam the supply of foamable liquid, air and water.

Where three liquids, one of which may be water from the town mains, are employed the container has three compartments separated by flexilbe membranes impervious to the liquids in contact with them, two of said compartments being sealed and containing liquids to be metered, and connected by feed lines to a metering device, the other liquid being supplied along a feed line to the foaming chamber, and a branch leads therefrom to the third compartment in the container.

A draining outlet may be provided in the feed line for the said other liquid and controlled by valves such that the said feed line may be drained or the pressure therein reduced to permit the sealed container or sealed compartments therein to be filled with a liquid or liquids prior to a spraying operation.

Where three compartments are employed in the container, the three compartments are disposed in layer formation and the branch is preferably connected to the central compartment, the central compartment containing spaced separators through which the liquid therein can flow freely and maintaining the membranes out of contact with one another when the liquid content of the central compartment is low.

In order that the invention may be more fully understood some embodiments in accordance therewith will now be described by way of example with reference to the accopanying drawings in which.

Figure 1:
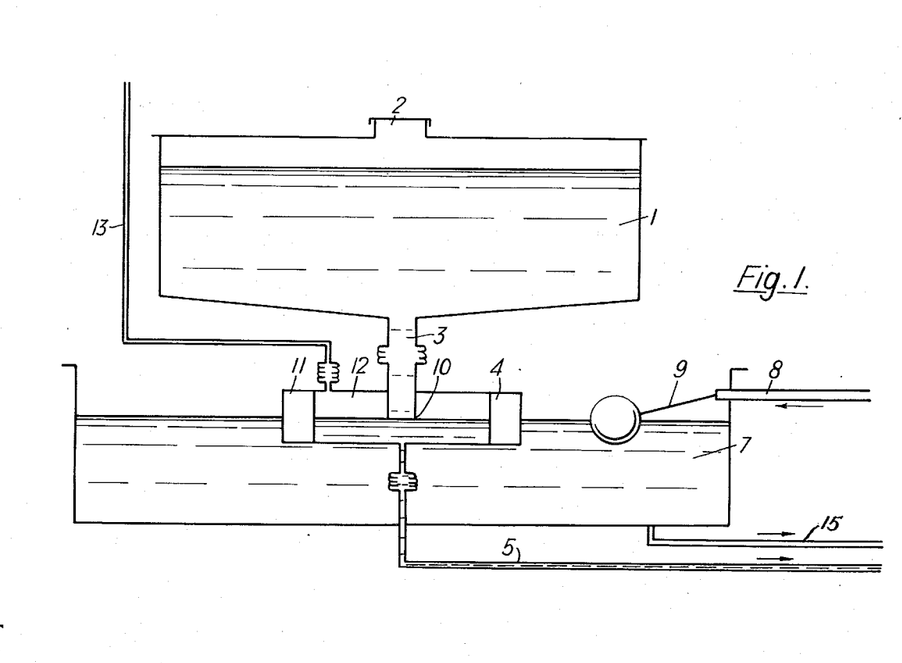
FIG. 1 is a diagrammatic cross section of a foamable liquid and diluent supply apparatus.
Figure 2:
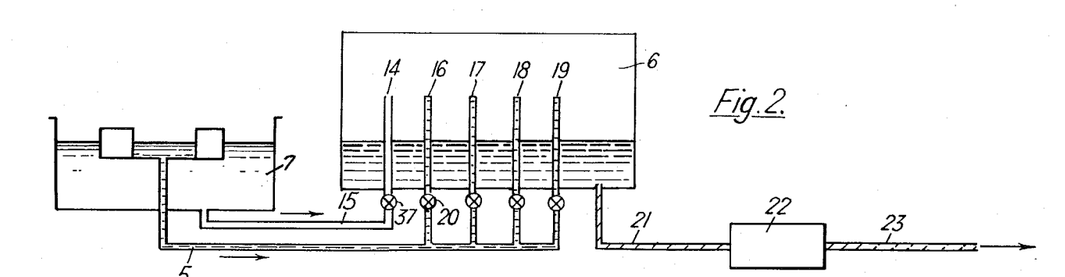
FIG. 2 is a cross section of the apparatus showing not only the construction of FIG. 1 but a mixing chamber and a delivery pump.

Referring to FIGS. 1 and 2 of the drawings, a concentrate of chemical foamable liquid is filled into a container or tank 1 which is then sealed against the ingress of air by a cap 2, and it has an outlet 3 in the form of a flexible connection, e.g. the pipe 5, leading to a mixing chamber 6.

A diluent is contained in a tank 7 to which the diluent flows through a pipe 8 from a source of supply, the pipe 8 opening into a ball valve 9 by which the level of diluent in the tank 7 is maintained substantially constant. The open end 10 of the pipe 3 is fixed to the float 4 so that the foamable liquid will seal its lower end in the float 4 with the level of the liquid in the float substantially in the plane of the surface of the diluent in the tank 7. An air space 11 is provided in the float to keep it buoyant and the float liquid-containing compartment 12 is open to the atmosphere through a connection 13 so that as the foamable liquid flows through the pipe 5 air will bubble up through the pipe 3 permitting more of the foamable liquid to pass down the pipe 3 and replenish the foamable liquid in the float.

The construction of the float can be varied, for example the air space could be disposed in the form of pockets in or around the float and the connection of the pipe 3 to the float may be vertical so that the level of the foamable liquid in the compartment 12 can be varied as desired although preferably it is coplanar with the diluent level in tank 7.

As seen in FIG. 2 a pipe 15 from the tank 7 leads at 14 into the sealed mixing chamber 6 which is under reduced pressure at a point above the level of the diluent in the tank 7 so that gravity assists in the feed of the diluent into the chamber 6 but the reduced pressure in the chamber 6, created by suction from the pump 22 draws the diluent and foaming liquid into the chamber which may therefore be level with or above the level of the tank 7. The pipe 5 is divided into a number of pipes, four pipes 16, 17, 18, 19 being shown, also opening into the chamber 6 on a level with the opening 14 in the pipe 15. If desired, the supply of diluent may be arranged so that instead of being supplied through a simple pipe 14, it is supplied through a series of pipes each fitted with or formed into an orifice of suitable proportions. The cock 20, however, may be varied to adjust the dilution of the concentrated foamable liquid in a predetermined manner. This cock 20 can be designed or manipulated to provide a predetermined concentration as an alternative to jet controlled metering. The cocks are primarily disposed in the "on" or "off" position, i.e. fully open or shut, the metering being performed through the orifices as selected by manipulation of the cocks. Although the openings of the pipes 15–19 in the chamber 6 are above the diluent level in the tank 7 they could be level with it or even below it but in the latter case syphoning of the liquids would result, which is generally not required.

From the mixing chamber 6 a supply pipe 21 is drawn off, the pipe 21 leading to a pump 22 in the mixture supply line 23 so that the pump engenders a reduced pressure in the chambers 6 thereby drawing the two liquids from tank 7 and the float 4 respectively. The jets or orifices of the pipes 15–19 in the chamber 6 are proportioned so as to give the desired ratio of concentrate and diluent. Either a single jet or a range of diluent jets may be introduced to give a wider range or closer ratio of the mixture. The proportioning by the said orifices also accommodates any difference in viscosity which may exist between the foamable liquid and the diluent.

Figure 3:
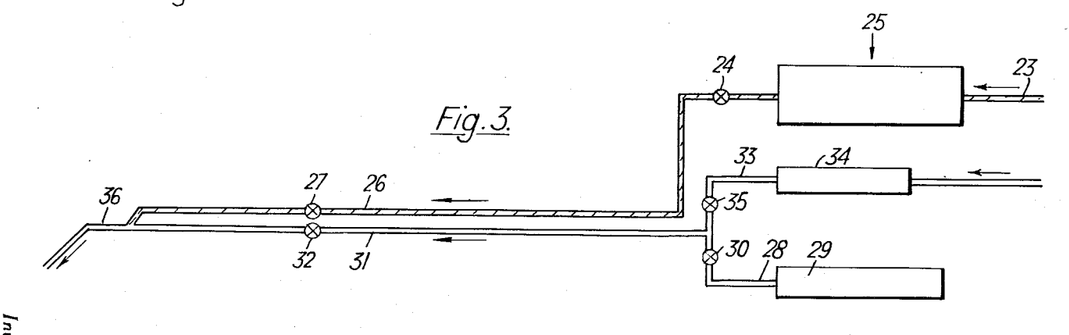
FIG. 3 is a diagram of the supply lines to a spraying apparatus.

Referring now to FIG. 3 it will be seen that the pipe 23 leads through the pump 22 from a metering unit, not shown, and passes from the pump 22 through a control valve 24 at the main supply point shown generally at 25. From the valve 24 a mixture supply line 26 runs to the lance or other spraying apparatus (FIG. 4) through a control valve 27 for the metered diluted foamable liquid the valve 27 being disposed in the line 26 so as to be readily available to the operator of the lance.

Also at the supply point is an air line 28 leading from a supply of compressed air such as compressor 29 through a control valve 30 to line 31 which unites with the line 26 in the vicinity of the lance, an operator's control valve for the line 31 being provided at 32 adjacent to the valve 27.

Also at the station 25 is a water supply line 33 which may have a pump 34 and leads through a control valve 35 into the line 31. It will thus be seen that the lance operator may by operation of the valves 27 and 32 adjust the supply of foamable liquid and air to the lance to form a foamed spray as will be described. When the spraying is concluded the operator closes the valve 27 and the valve 30 at the same time opening the valve 35 so that the spray lance is then used for spraying a rinsing liquid on to the foam coated surface previously sprayed from the lance. By appropriate adjustment of the valves 27, 32, 35 and 30 the operator can supply either foamed or unfoamed liquid, or air or water separately, or mixture of air and water, so that by a single pipe line 36 the lance is supplied with the appropriate materials or mixtures thereof selected by the operator.

The concentrated foamable liquid is preferably supplied mixed with the diluent but the valve 35 may be closed so that undiluted foamable liquid is supplied to the lance.

Figure 4:
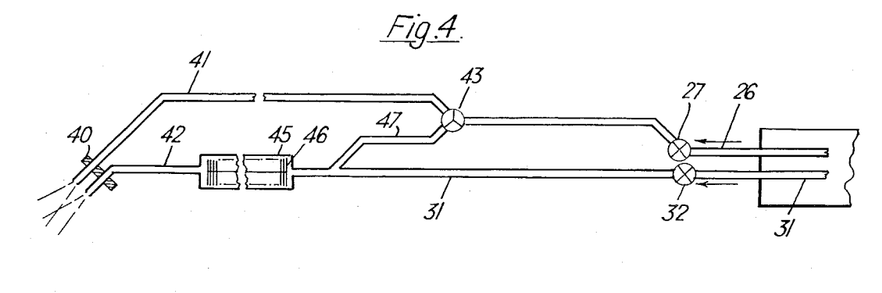
FIG. 4 is a diagram of a spraying lance.

Referring to FIG. 4 this shows a spraying lance formed to twin spray jets or nozzles 40 supplied by pipes 41, 42. The pipe 41 passes a two-way valve 43 to the valve 27 and thence along the pipe 26. The pipe 42 is attached to the outlet end of a foaming chamber 45, which is supplied from the pipe 31 through the valve 32. A bypass 47 leads from the valve 43 to the pipe 31. The chamber 45 contains a foam inducing material 46 which may be any material with fine passages therethrough causing the foamable liquid and air in it to integrate to form a more stable and homogeneous foam than is possible with a mere mixing of air and the chemical without such a device. Such a foam inducing material may be a spiral or a series of spirals, a gauze material, a network, a lattice, a mass of jumbled fibres, or a cellular material. The three-way valve may enable the operator to pass the foamable liquid to the upper nozzle 40 direct or to the nozzle through the chamber 45.

The foamable liquid may be one which will clean the surface, strip paint, remove oxide or tarnish films, brighten the surface or effect a chemical alteration of the surface. Where a wetting agent is used this may itself act as the foaming agent and some materials have the characteristic of foaming stable foams when mixed with air without the addition of special foaming agents.

Figure 1A:
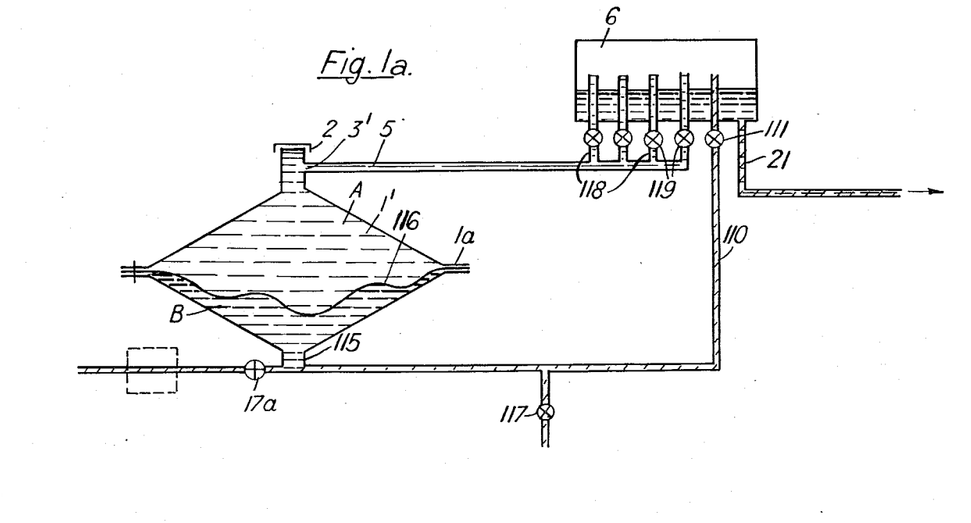
FIG. 1a is a diagrammatic representation of an apparatus for delivering two mixed fluids in constant volumetric ratio.
Figure 2A:
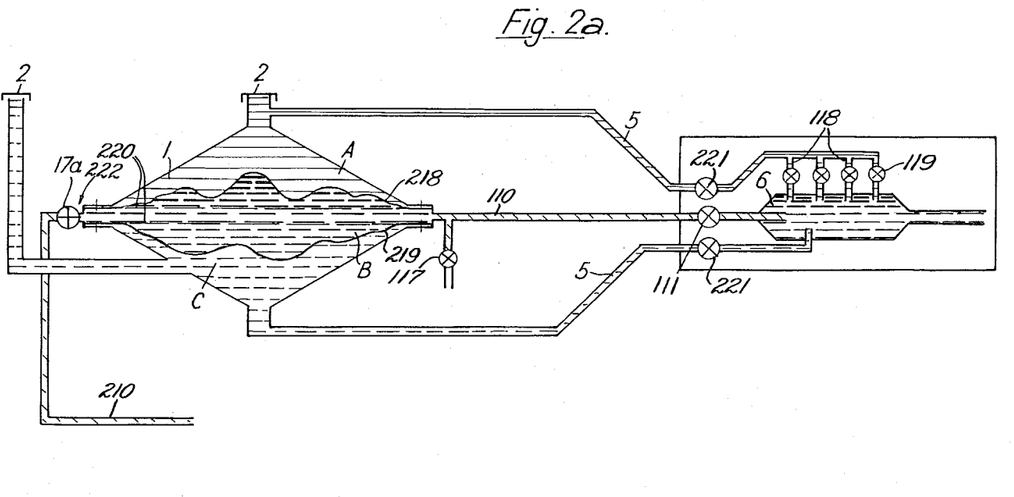
FIG. 2a is a similar representation to FIG. 1a but showing an apparatus for delivering a mixture of three fluids at a constant volumetric ratio.

Referring to FIGS. 1a and 2a, FIG. 1a shows a container 1 formed of two halves in the form of shallow domes united by a fluid-tight seal 1a in which is sealed a flexible membrane 16 of a material which is inert and impervious to the fluids to be in contact with it. The membrane 16 is larger in area than the cross-sectional area of the container at the seal 1a so that if the container is empty the membrane would sag and even, if desired, lie on one bounding wall of the container. The membrane thus divides the container into two compartments for separately containing fluids A and B and an important feature of the diaphragm is that it is sufficiently large to occupy a position to move freely between the two liquids and by forming an artificial, impervious and substantially frictionless barrier between the fluids ensures that an even pressure exists in the two fluids in the container. The container is shown to be in the form of two domes. However, the principle employed is equally applicable to any shape of vessel providing a diaphragm of suitable configuration and material is employed.

In FIG. 1a the fluid A is a concentrate of a chemical liquid material, which may be a foamable chemical, and when the liquid has been filled into the container it is then sealed by a cap 2. This container has an outlet 3' on the side of the diaphragm 116 remote from the liquid B and leading into a pipe 5 whence the liquid A is fed to a delivery point shown as a mixing chamber 6 of a metering device of the type previously described. The pipe 5 is divided into several pipes 118 each controlled by a valve 119, leading into the chamber 6 so that by operation of one or more of the valves 119 the desired proportion of the concentrate will flow into the chamber 6.

The second fluid B is for example water from the town mains or a liquid from a presure tank or a pump, to be mixed with the concentrate A, and is fed along the line 110 to the chamber 6 through a control valve 111. An outlet 21, which may be controlled by a valve (not shown) leads from the chamber 6 along which metered or mixed liquids A and B i.e. diluted solution of the concentrate, is fed to an ultimate delivery point such as a spraying lance which preferably incorporates a foam inducing device, for example as herein described. The metering device 6 is also preferably constructed as herein described.

From the feed line 110 a branch 115 is led into the lower half of the container 1' in which the two liquids are separated by the flexible membrane 116. Thus when the fluid B flows along the line 110 the lower part of the mixing chamber 6 will start to fill with the liquid B and impart to the concentrate A its pressure so that the concentrate A and liquid B in line 110 will be fed at the same pressure to the chamber 6 and from the chamber 6 along the delivery line 21 to the delivery point.

The pipe 110 is provided with a drain controlled by a valve 117 so that, when an isolating valve 17a is closed, the line 110 can be emptied or the pressure therein substantially reduced, perhaps to atmospheric pressure, so that the container 1' can be filled with the concentrate A.

In use the liquid B is applied under pressure to one side of the diaphragm 116 which transmits this same pressure to liquid A contained in it on the other side of the diaphragm and the principle employed is equally applicable to any shape of container provided a diaphragm of suitable configuration and material is employed.

When liquid A in the container is exhausted and the part of the container needs replenishment, the valves 117 and 17a are operated to enable the liquid B to flow to waste or to return to a storage container by some suitable external pumping or gravity feed arrangement.

Mention should be made that the individual valves 119 in the metering device may be omitted, if so desired, and the ends of the pipes 118 are supplied with apertures of predetermined sizes to give a homogeneous mixture of the fluids, in volumetric proportion to the aperture sizes.

Referring to FIG. 2a, this shows two fluid compartments, e.g. for different concentrates A and C, in the container 1'. The compartments are in the form of layers one above the other, the contiguous compartments being separated by membranes 218, 219 similar to the membrane 116 in FIG. 1a. Since the central compartment is for the fluid B, the central compartment has spaced separators 220 which keep the membranes 218, 219 apart when the container content of liquids A and/or C is large. The inlet 222 for the fluid B enters the container between the separators. The separators 220 are constructed, as with perforations, to permit the fluid B to flow freely therethrough. The fluid in the central compartment may be a gas under pressure, such as air, and in such circumstances the valve 111 could be kept closed so that the gas in the central compartment is maintained at constant pressure. B may however be a liquid which flows with A and C into the chamber 6.

In this construction the central container compartment forms an enlargement of the feed line 210 or it may be a branch of the line 10 in FIG. 1.

From the metering chamber 6 the metered or mixed liquids flow to a delivery point such as the spraying lance constructed and operated as described with reference to FIG. 4 of the drawings.

Both the container of FIG. 1a and of FIG. 2a or several of each kind may be arranged in series or in parallel in such manner that liquids under pressure in any of the containers employed may be used to actuate other containers in the system. Thus a multiplicity of liquids may be dispensed under the action of a single compressed gas, such as air, provided at suitable pressure.

As an extension of the metering device described herein, this device may be operated remote from the container 1 or containers in such manner that the operator has control of the various liquids transmitted under the action of the said pressure. The advantage of this remote arrangement is that such control permits an immediate change of any desired ratio of the fluids without the need to clear the delivery feed pipes of the dilution employed prior to such change. The control valves 119 of the metering device and the chamber 6 may be employed on a lance or spray gun. To facilitate handling, the individual valves 119 may be replaced by an arrangement by means of which they are severally controlled by means of a single actuator. Valves 221 and the valve 111 shown in FIG. 2a enable the operator to shut off each or any of the fluids at will while continuing to use the remainder.

It will be understood that the pipe 5 for the liquid C may be connected into the chamber 6 by a plurality of valves as is employed for the liquid A.

The lance, to which the metered fluids may be fed from the metering device by the pressure in the chamber 6 may be constructed as already described in and shown in the drawings. The method and apparatus of the invention may however have other uses for example in supplying a liquid fuel and air mixture to a burner.

Figure 5:
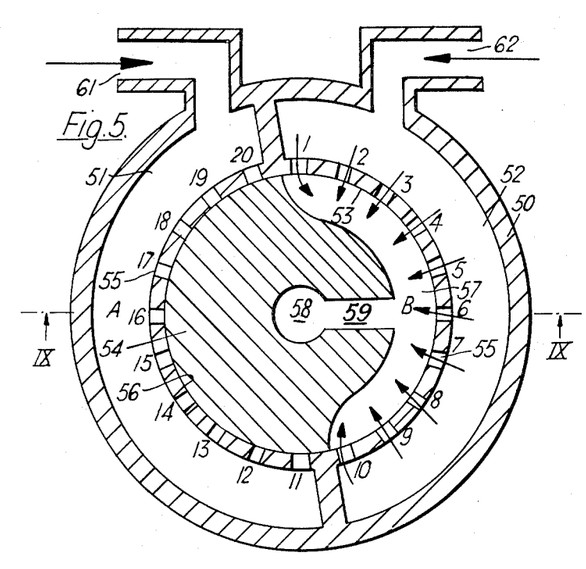
FIG. 5 is a cross section through a metering device.
Figure 6:
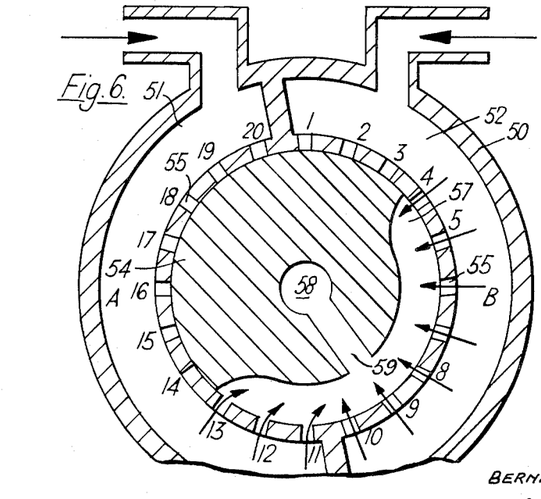
FIG. 6 is a section similar to FIG. 5 showing the device in a different operative position.

Referring to the accompanying drawings, FIGS. 5 and 6 show a device for metering the fluids and is designed to operate by the spraying lance operator and may be incorporated in the lance, but may be used to replace the multiple cock system to the metering chamber in the constructions previously described herein. This device is basically a two part valve member in which one part is movable to control flow through adjustable combinations of a number of holes in the other part so that the proportions of the two fluids flowing under control of the valve are allowed to flow in predetermined proportions.

The valve comprises a hollow valve body 50 divided into two demi-annular cavities 51, 52 into which fluids A and B respectively flow. The inner circular wall forms on its inner face 53 a bearing for a rotary spigot 54 to be described and has a number of holes 55 therethrough for the cavities 51, 52 into the spigot cavity. For equal increment metering the holes 55 are all of the same size. The spigot may be tapered or a right cylinder and its cavity is similarly shaped so that it is a rotary sliding fit therein. The spigot has a solid portion 56 and a groove 57 communicating with a central outlet passage 58 through a duct 59.

Figure 9:
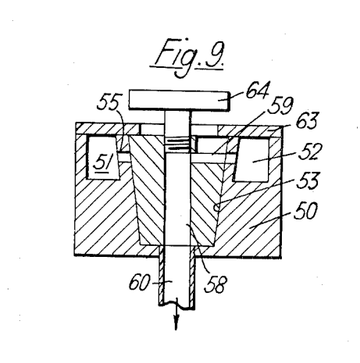
FIGS. 9 and 10 are respectively cross sections on the lines IX—IX and X—X of FIGS. 5 and 7.

The body 50 has an outlet communicating with the passage 58, and inlets 61, 62 for the fluids A, B respectively. The spigot is held in place by a body cap 63 and is rotated by a knob 64 or the like (FIG. 9), suitable fluid tight seals being provided between the relatively movable parts. A locking device, such as a spring pressed ball on one valve part engaging in indentations in the other valve part, is preferably provided to hold the spigot as set by the knob 64 to maintain the fluid flow set by movement of the spigot.

Thus by positioning the spigot as in FIG. 5 only fluid B flows, but if positioned as in FIG. 6 the proportions of fluids are 3A/7B. If B is the foamable liquid and A the diluent then in FIG. 5 neat or 100% liquid B is supplied to the sprayer and in FIG. 6 a 70% liquid B solution is supplied to the sprayer.

Figure 7:
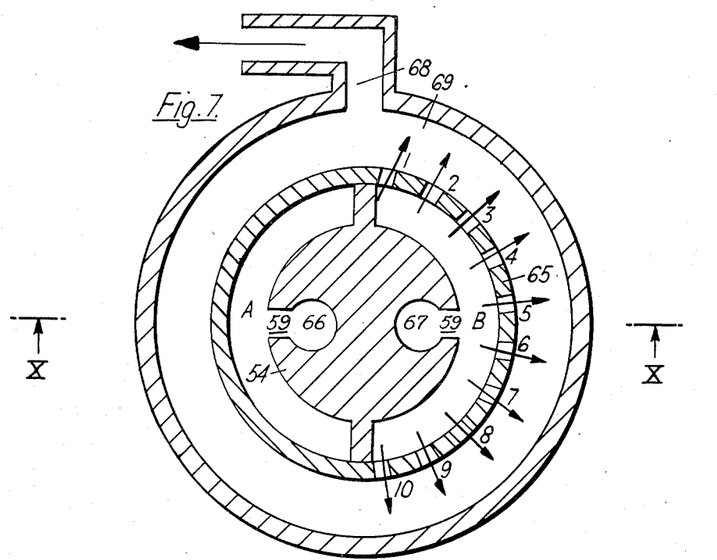
FIGS. 7 and 8 are views similar to FIGS. 5 and 6 showing another form of metering device.
Figure 8:
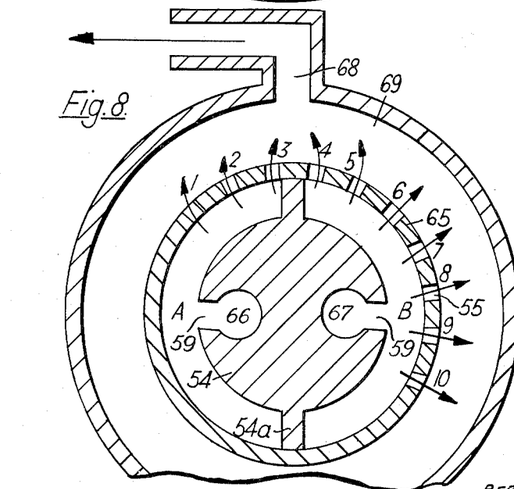
Figure 10:
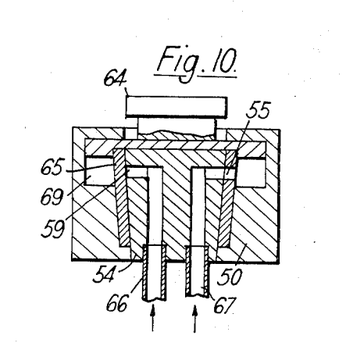

Referring to the accompanying FIGS. 7, 8 and 10 the spigot 54 is fixed to the valve body 50 and the annulus 65, having holes 55 rotates therein as by turning the knob 64. The spigot has two ducts 59 one for each inlet passage 66, 67 for fluids A, B respectively, and the valve body 50 has a single mixture outlet 68 leading to the sprayer from a single annular cavity 69. The construction and operation of this valve is otherwise the same as for that described with reference to FIGS. 5, 6 and 9.

A spigot or disc or face valve of the type shown in FIGS. 7 and 8 could be modified for proportioning three or more liquids, in which case the central portion 54 would be divided by three or more vanes 54a and having one or more rotatable annuli 65. The spigot valve of FIGS. 5 to 8 may be made in the form of two disc shaped bodies, one of which represents the body and the other the rotatable portion, the passages and cavities therein being shaped similarly to those described with reference to FIGS 5 and 6 or FIGS. 7 and 8.

Figure 11:
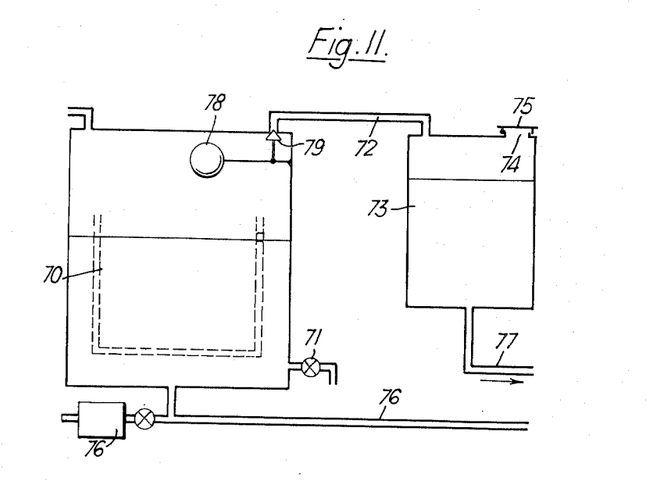
FIG. 11 is a diagrammatic cross section through yet another form of apparatus for delivering mixed fluids.

Referring to FIG. 11 this shows an air compression tank 70 which starts off empty (having been drained by cock 71) connected by an air pipe 72 to a chemical concentrate tank 73 which, after filling at point 74 is sealed off by a pressure tight cap 75. Diluent is admitted to tank 70 via pump 76 or under mains water pressure where water is a suitable diluent, compressing the air in the space above it to the same pressure. This pressure is transmitted via pipe 72 to the concentrate B and both diluent and concentrate are exactly equally pressurised. Feed pipes 76 and 77 supply the metering device already described.

The advantage of this construction is that it obviates the requirement for a diaphragm, and thereby the attendant possibility of failure when corrosive chemicals are used. The only moving part is the conventional ball float 78 operating valve 79 if the compression tank completely fills. This will never occur if the two vessels are appropriately sized in relation to the dispensing pressures employed and if cap 75 is properly sealed.

The tank 73 may be disposed within the tank 70, in which case an orifice is provided in the tank 73 above the common liquid level therein to cause air to flow from 70 into 73 to assist in equalizing the pressure levels in the two tanks.

It will be appreciated that where relatively high dispensing air pressures are employed, the size of tank 73 in relation to 70 must be compartively large since $P_1V_1=P_2V_2$ (at constant temperature). The size of tank 73 can be reduced by pre-pressurising it with air to a lesser pressure than the diluent supply, and allowing the diluent supply to overcome this, to the required operating pressure.

Referring to FIG. 4 of the drawings, the foaming chamber 45 is an elongated closed tubular container, e.g. six feet long and, for example, one inch internal bore, and is substantially filled with spirals of wire each, for example, ⅛–¼ inch diameter coils with say six turns to the inch and 1/32 inch diameter wire, and any number of such spirals may be employed disposed in parallel longitudinally of the chamber with inter-engaged coils, so as substantially to load the chamber with a multiplicity of fine passages therethrough at many different angles to the longitudinal axis of the chamber. Thus the material to be foamed and gas is fed to the chamber at such a speed and pressure that they are forced to change momentum continuously at short intervals of time and distance over the full length of the chamber thereby creating a stable foam, which will remain in a foamed condition for several minutes or at least long enough to remain foam until washed from the surfaces to which they have been applied.

It will be seen that by means of the invention the apparatus provided is portable and apart from the lance and the supply line or lines thereto can be disposed well away from the article e.g. an aircraft being cleaned. The foaming material has the advantage that it reduces the rate of evaporation. The foamed liquid adheres to the surface sprayed and remains thereon for sufficient time to permit it to perform its desired function. Then, using the same lance, the foamed liquid and any products of its action can subsequently be rinsed off with water and then dried with compressed air which may be heated without difficulty.

The characteristics of a foamed liquid is that the drain-off tendency is minimised, the period of contact thereof with the surface is increased and the vaporizing effects due to temperature are minimized and thereby a considerable saving in the treating liquid employed is achieved.

It will also be seen that by maintaining the pressure heads of the foamable liquid and the diluents the same, the mixing of the two liquids is facilitated which is assisted by there being an equal application of low pressure to each of the liquid lines in the chamber 6.

The whole apparatus is preferably operated by a prime mover e.g. a petrol engine or electric motor driving the pumps and air compressor.

With the valve of FIGS. 5–10, the metering device can be close to or built into the lance, and thus the operator can set his concentration of foam as required, can change it at will to suit the work in hand, and has no complicated machinery to carry; the bulk supply control of the liquids can be at a central point remote from the lance and is simple in construction, and light in weight. Moreover several lances can be operated independently, all fed from a bulk supply apparatus such as shown by way of example in the drawings.

What I claim is:

1. A method of applying a foamed material to a surface comprising feeding a foamable liquid and at least one other liquid under pressure to a foaming chamber elongated in the direction of flow and containing over a major portion of its length a foam inducing material having a multiplicity of tortuous fine passages therethrough, separately feeding a gas to the chamber, the rate of flow and pressure of the liquids and gas in the chamber being such as to force the foamable liquid through said passages continuously to effect momentum changes and to cause foaming of the foamable liquid by dispersal of the gas as a plurality of bubbles therein, and discharging the foamed liquid on to a surface directly from the chamber without the addition of further materials through a closely associated spraying device in direct communication with the foaming chamber.

2. A method according to claim 1 wherein the foamable liquid and a predetermined amount of one of said other liquids, which may be a diluent for the foamable material, are first fed to a metering chamber, said one of said other liquids having been caused to impart its pressure to each said liquid so that the liquids are fed to the metering chamber at the same pressure, mixing the liquids in the metering chamber in predetermined proportions, and feeding the metered and mixed liquids under pressure to the said foaming chamber.

3. A method according to claim 1 wherein said foamable liquid is formed by mixing a detergent, a wetting agent and a foaming agent.

4. An apparatus for applying a foamed material to a surface, comprising a foaming chamber elongated in the direction of flow and means for introducing thereinto under pressure a gas and at least two liquids, one of which is a foamable liquid, a foam inducing material disposed in said chamber and extending over a major portion of the length of said chamber, said material having a multiplicity of tortuous fine passages therethrough, through which the gas and the liquids are passed continuously to effect momentum changes therein to cause foaming of the foamable liquid by dispersal of the gas as a plurality of bubbles therein, and a spraying device closely associated with the chamber and in communication with the interior thereof for spraying the foamed liquid direct from said chamber without the addition of further materials onto a surface.

5. An apparatus according to claim 4 wherein said means for introducing a gas and liquids to the foaming chamber comprises a metering device including a mixing chamber, a supply line for one of said liquids connected to said mixing chamber, a fluid-tight compressible container for each remaining liquid and an outlet from each container leading through a duct to said mixing chamber, a receptacle in said supply line having as one wall a flexible, liquid impervious diaphragm contiguous to and in pressure contact with each of the said compressible containers, and an outlet from said receptacle leading through a duct to said chamber.

6. An apparatus according to claim 4 wherein said means for introducing the gas and liquids to the foaming chamber comprises a receptacle for one of said liquids connected by a duct to the metering device, a fluid-tight container for each remaining liquid, each container having an outlet leading to a hollow float, floatable on said one liquid in said receptacle so that said one and the other liquids each have a surface all lying in the same horizontal plane, and an outlet for each other liquid leading from the hollow float to the metering device so that all the liquids are fed to the metering device at the same pressure from the same head of said one liquid.

7. An apparatus for applying a foamed material to a surface comprising an elongated foaming chamber having means for introducing thereinto a gas and at least two liquids, at least one of which is a foamable liquid, a foam inducing material disposed in said chamber over a major portion of the length of the chamber and having a multiplicity of tortuous fine passages therethrough, through which the gas and liquids are passed continuously to effect momentum changes therein to cause foaming of the foamable liquid by dispersal of the gas as a plurality of bubbles therein, and a spraying device closely associated with said foaming chamber and in direct communication with the interior thereof whereby the foamed material is sprayed direct from said chamber without the addition of further materials thereto onto a surface, in combination with a metering device and duct means connecting said metering device to said foaming chamber, said metering device including a mixing chamber and a supply receptacle having three compartments separated by flexible membranes impervious to liquids, two of said compartments being sealed except by a duct connected to said mixing chamber and containing liquids to be metered, the third compartment containing a pressure imparting liquid supplied from a feed line and also being connected by a duct to said mixing chamber.

8. An apparatus according to claim 7 wherein said three compartments are disposed in vertical layers and said pressure imparting liquid feed line is connected to the central compartment, said central compartment containing spaced, porous separators which maintain said membranes out of contact with one another when the liquid content of the central compartment is low.

9. An apparatus for applying a foamed material to a surface comprising an elongated foaming chamber having means for introducing thereinto a gas and at least two liquids, at least one of which is a foamable liquid, a foam inducing material disposed in said chamber over a major portion of the length of the chamber and having a multiplicity of tortuous fine passages therethrough, to which the gas and liquids are passed continuously to effect momentum changes therein to cause foaming of the foamable liquid by dispersal of the gas as a plurality of bubbles therein, and a spraying device closely associated with said foaming chamber and in direct communication with the interior thereof whereby the foamed material is sprayed direct from said chamber onto a surface, in combination with a metering device and duct means connecting said metering device to said foaming chamber, said metering device comprising a two-part valve, means for effecting relative movement between the two parts, a number of holes of different size in each part disposed so that by said relative movement one or more holes in each part may be brought into register with one or more holes in the other part, the parts being located in a valve having liquid inlets and a mixed liquids outlet through which the liquids flow to and from said holes.

10. An apparatus according to claim 9 wherein said two valve parts comprise a valve body and a spigot relatively movable one to the other, the spigot having at least one flow passage therein leading to a groove communicating with the said holes therein, the holes in said valve body being disposed in an annular member communicating with at least one liquid flow passage in the valve body.

11. An apparatus for supplying a mixture of fluids in a predetermined volumetric ratio to a delivery point under pressure comprising at least one fluid-tight container for a foamable liquid, a metering device including a mixing chamber, a container for a pressure imparting fluid including a liquid impervious membrane so constructed and arranged that the pressure imparting fluid is out of physical contact with fluids in said containers but imparts its pressure through said membrane, an outlet from each container leading to said mixing chamber, an outlet for the fluid mixture formed in the mixing chamber, a pump, a foaming chamber including a foam inducing agent through which the fluids are forced to effect foaming thereof, said outlet from the mixing chamber being connected to said pump which in turn is connected to said foaming chamber, a pipe connected to a multiple valve in turn connected to an outlet in said foaming chamber, a water supply and a compressed air supply, said valve being operable to cause at will foamed liquid, aerated rinsing water and a rinsing fluid to be supplied to a spraying device in succession.

12. An apparatus for supplying a mixture of liquids in a predetermined volumetric ratio to a delivery point under pressure, comprising a device for feeding a pressure imparting liquid and other liquids including a foamable liquid to a metering device, a compressible container having an outlet leading to the metering device for each liquid other than the pressure imparting liquid, a hollow body including membrane means through which the pressure imparting liquid flows in pressure contact but without physical contact with each remaining liquid in said containers to impart a pressure to cause all said liquids to be fed to the metering device at the pressure of the pressure imparting liquid, and means to feed the mixture from the metering point to the delivery point, said means comprising a spray nozzle, an elongated foaming chamber mounted on said nozzle and a foam inducer in said foaming chamber.

References Cited by the Examiner

UNITED STATES PATENTS

| | | | |
|---|---|---|---|
| 1,179,708 | 4/1916 | Durham | 134—36 |
| 1,390,176 | 9/1921 | Struve | 239—323 |
| 2,043,599 | 6/1936 | Waldschmidt | 169—15 X |
| 2,183,561 | 12/1939 | Hamblin | 169—15 X |
| 2,578,994 | 12/1951 | Dunaway | 134—100 X |
| 2,716,996 | 9/1955 | Baverlein | 222—129.2 X |
| 2,910,075 | 10/1959 | Federighi | 134—100 X |
| 3,021,863 | 2/1962 | Low | 222—129.2 |
| 3,062,410 | 11/1962 | Schwieger | 222—129.2 X |
| 3,172,477 | 3/1965 | Grisdale et al. | 169—15 X |

FOREIGN PATENTS

| | | |
|---|---|---|
| 644,103 | 7/1962 | Canada. |
| 283,316 | 1/1928 | Great Britain. |
| 428,103 | 5/1935 | Great Britain. |
| 529,225 | 11/1940 | Great Britain. |
| 333,658 | 1/1936 | Italy. |
| 526,820 | 5/1955 | Italy. |

OTHER REFERENCES

German application 1,117,088, printed Nov. 16, 1961 (KL., 12g 1/01).

RAPHAEL M. LUPO, *Primary Examiner.*

CHARLES A. WILLMUTH, *Examiner.*